US007744114B2

(12) United States Patent
Menichini

(10) Patent No.: US 7,744,114 B2
(45) Date of Patent: Jun. 29, 2010

(54) PUSHCHAIR FOR ELDERLY OR DISABLED ADULTS FOLDABLE IN TWO PLANES

(75) Inventor: Luigi Menichini, Foligno (IT)

(73) Assignee: Ormesa S.R.L., Foligno PG (IT)

(*) Notice: Subject to any disclaimer, the term of this patent is extended or adjusted under 35 U.S.C. 154(b) by 495 days.

(21) Appl. No.: 11/667,141

(22) PCT Filed: Nov. 14, 2005

(86) PCT No.: PCT/IT2005/000641

§ 371 (c)(1),
(2), (4) Date: May 4, 2007

(87) PCT Pub. No.: WO2006/048913

PCT Pub. Date: May 11, 2006

(65) Prior Publication Data

US 2008/0093821 A1 Apr. 24, 2008

(30) Foreign Application Priority Data

Nov. 8, 2004 (IT) ......................... MC2004A0133

(51) Int. Cl.
*B62B 9/12* (2006.01)
*B62B 7/06* (2006.01)
*B62B 7/08* (2006.01)

(52) U.S. Cl. .......................... 280/639; 280/42; 280/647

(58) Field of Classification Search ................. 280/639, 280/287, 242.1, 250.1, 647, 42, 649, 650
See application file for complete search history.

(56) References Cited

U.S. PATENT DOCUMENTS

| | | | | |
|---|---|---|---|---|
| 3,390,893 | A * | 7/1968 | MacLaren | 280/39 |
| 4,062,555 | A * | 12/1977 | Peng et al. | 280/42 |
| 4,415,202 | A * | 11/1983 | Pew | 5/86.1 |
| 4,572,576 | A * | 2/1986 | Minnebraker | 297/423.37 |
| 4,640,519 | A * | 2/1987 | Bigo | 280/42 |
| 4,730,842 | A * | 3/1988 | Summers et al. | 280/638 |
| 4,790,553 | A * | 12/1988 | Okamoto | 280/250.1 |
| 5,244,223 | A * | 9/1993 | Uchiyama | 280/250.1 |
| D355,874 | S * | 2/1995 | Nelson | D12/129 |
| D427,550 | S * | 7/2000 | Lee | D12/129 |
| 6,113,128 | A * | 9/2000 | Watkins | 280/647 |
| 6,464,242 | B2 * | 10/2002 | Suzuki | 280/642 |
| 7,178,822 | B2 * | 2/2007 | Chen | 280/642 |
| 2002/0171227 | A1 * | 11/2002 | Eguchi et al. | 280/650 |

* cited by examiner

*Primary Examiner*—Glenn Dayoan
*Assistant Examiner*—Chiedu A Chibogu
(74) *Attorney, Agent, or Firm*—Hodes Pessin & Katz, P.A.

(57) ABSTRACT

The present invention relates to a push chair for elderly or disabled adults, of the type formed of two tubular sides, with a seat and a backrest with collapsible structure fixed between them, capable of being brought closer and farther by means of two pantograph-shaped crosspieces interposed between them, characterized in that the two sides are simultaneously moved close and folded, in such a way that the front wheel of each side is placed in vertically aligned position above the back wheel.

8 Claims, 4 Drawing Sheets

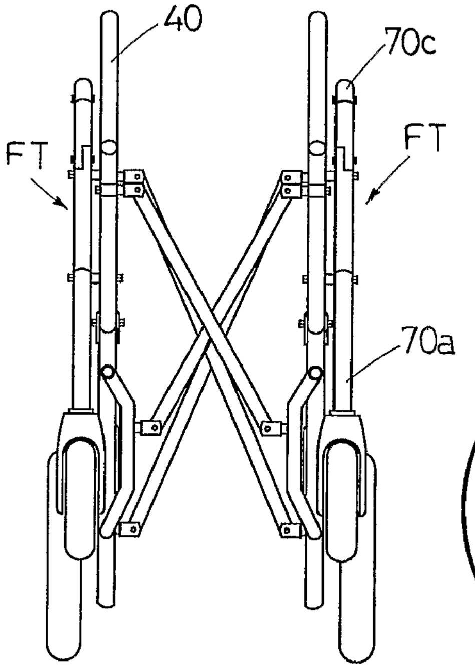
FIG. 2A
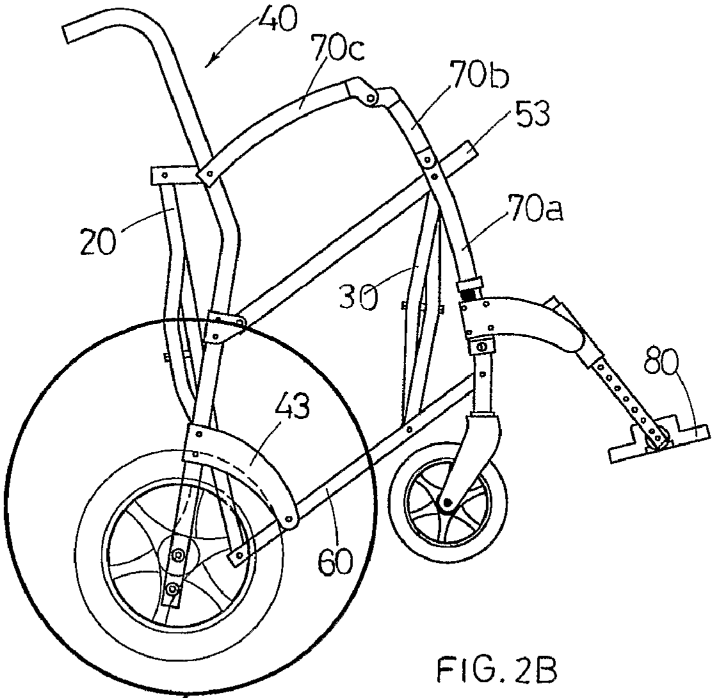
FIG. 2B
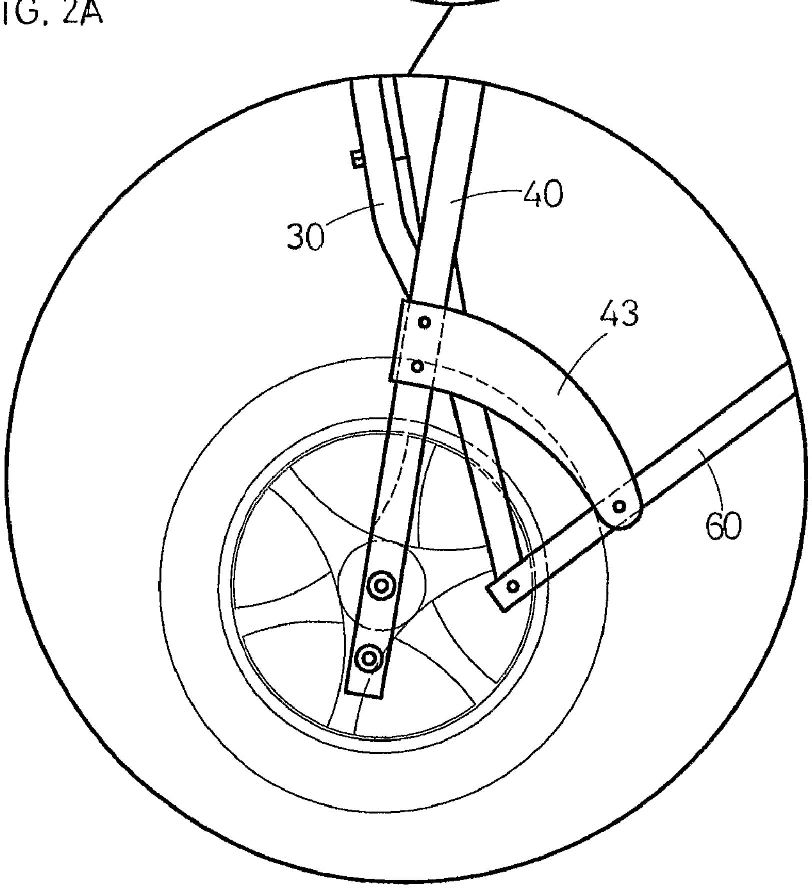

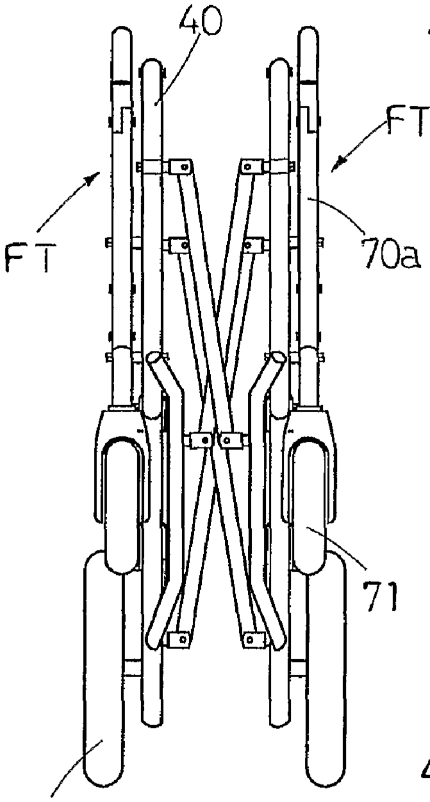
FIG. 3A
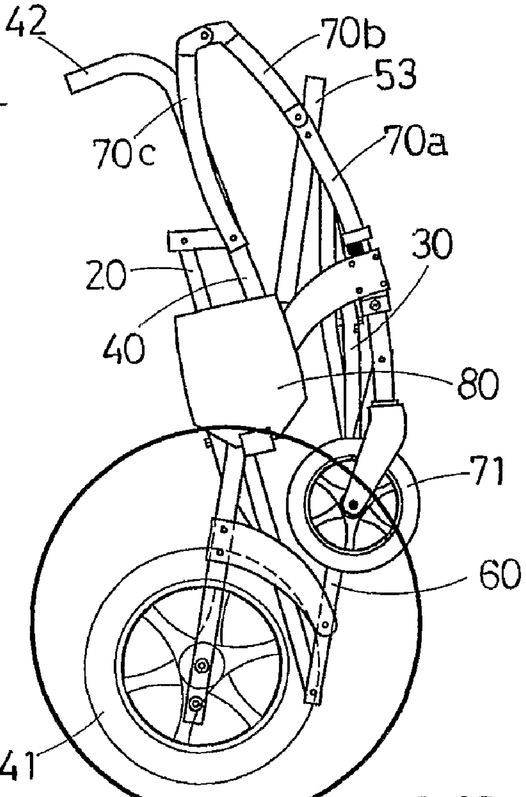
FIG. 3B
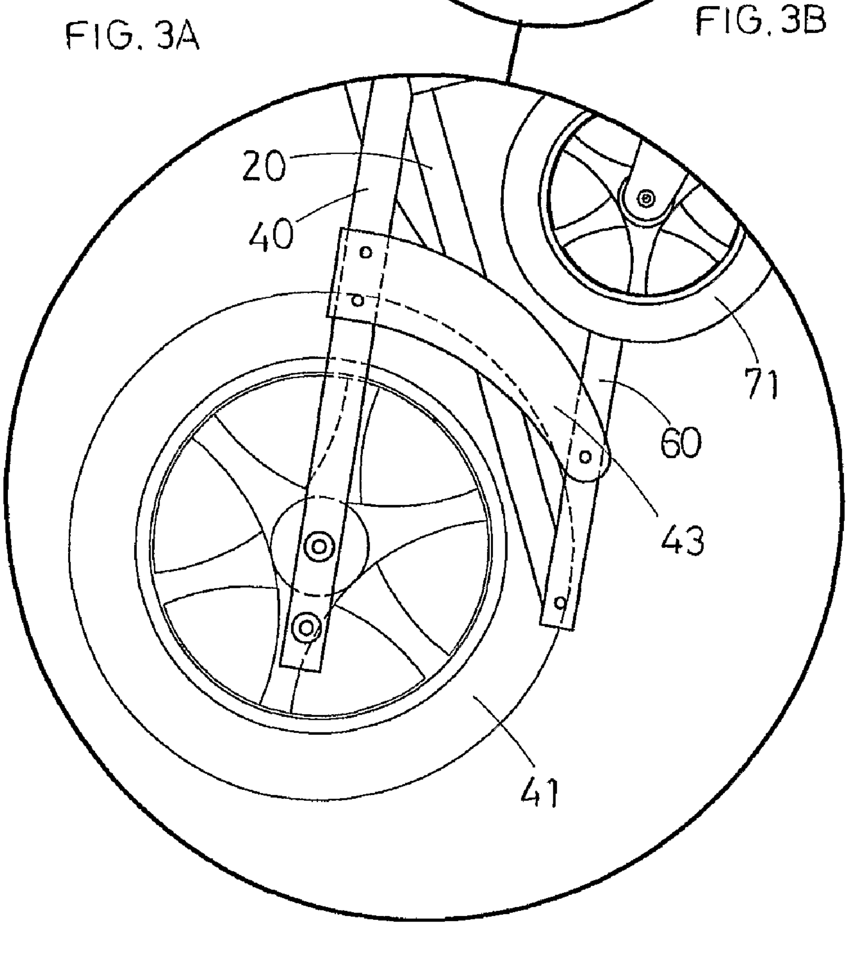

PUSHCHAIR FOR ELDERLY OR DISABLED ADULTS FOLDABLE IN TWO PLANES

The present patent application refers to a push chair for elderly or disabled adults with easily compactable structure.

The object of the invention falls within the sector of push chairs used to transport elderly or disabled adults, which are mainly composed of a metal tubular structure capable of being compacted in order to reduce volume in non-operating conditions.

As it is known, push chairs of this type are made of two identical tubular frames, with basically triangular plan, designed to be mounted one next to the other one to form the sides of the push chair.

In particular, each side is obtained with three different section of metal tube, which are hinged in such a way as to form the three sides of a right-angled triangle.

The triangular structure includes a longer cathetus in the rear tubular section, with basically vertical direction and designed to support an upper knob to operate the push chair; a shorter cathetus in the lower tubular section, with basically horizontal direction, pivoted on the back on the lower end of the vertical section; and finally the hypotenuse in a tubular section, with inclined direction, basically designed to connect the upper end of the rear/vertical section and the front end of the lower/horizontal section.

In most configurations of push chairs of known type, the lower end of the rear vertical section of each side is designed to support a lower wheel, while a second wheel is mounted on the same side under the front end of the lower tubular section, with basically horizontal direction.

The seat and backrest, both with collapsible structure, are fixed between two tubular sides of this type.

The same sides are mutually connected by means of two pantograph-shaped crosspieces, of which one cross-piece is positioned on the back of the push chair (basically at the height of the back wheels) and the other crosspiece is positioned on the front of the push-chair (in slightly more internal position with respect to front wheels).

Once they are blocked in spread position, the crosspieces maintain the push chair in operating conditions, preventing the two sides from getting closer accidentally. However, once they are unblocked, they permit to bring the two sides close, until they touch each other, in order to compact the push chair for transportation, storage, and similar purposes.

Moreover, in this type of push chairs, when they are brought close to each other, the two sides fold, so that the entire push chair gets compacted both in terms of width (i.e. distance between the two sides) and depth (i.e. distance between front and back wheel of each side).

Closing of the two sides in terms of depth is made possible by the fact that, in each side, the two tubular sections/catheti fold and translate in such a way that they basically get in contact with the third tubular section/hypotenuse so that the front and the back wheel of each side are in very closed position and the push chair can slide on the four wheels, regardless of being compacted.

In spite of being very common, this consolidated type of push chairs fro adults is impaired by significant drawbacks, basically related with the modes used to compact the sides after closing the pantograph-shaped crosspieces.

Firstly, also in compacted position, traditional push chair for adults have a big volume, both in terms of depth and height.

The big volume in terms of depth is due to the perfect alignment, although at close distance, of the two front wheels with the back wheels; and the big volume in terms of height is due to the fact that the tubular section of each side around which the other two tubular sections are compacted (which determines the total height of the push chair in compacted position) is the tubular section/hypotenuse with considerable length.

Moreover, in traditional push chairs for adults, the lower ends of the two pairs of tubular sections forming the pantograph-shaped crosspieces are associated with cylindrical sleeves that externally slide on the tubular sections of the corresponding sides, during reciprocating actuation of the crosspieces.

Evidently, the reciprocal sliding of the sleeves in external position with respect to the tubular sections of the two sides of the push chair determines considerable friction that, on one side, requires significant physical effort from the person in charge of opening and closing the push chair and, on the other side, causes the immediate wear of the tubular elements involved in the coupling/sliding movement.

Likewise, traditional push chairs are normally provided with a pair of footrest platform equally designed to be compacted in order to reduce their volume.

In fact, the two footrest platforms can be laterally rotated and placed edgeways next to the sides; this solution is satisfactory only when the push chair is closed completely and stored away.

Undoubtedly, when placed edgeways next to the sides, the said platforms are a considerable lateral impediment until the push chair is maintained in operating position and the user needs to get close to a car, a water-closet, etc.

A critical examination of the drawbacks of the prior technique has resulted in designing the new push chair of the invention that, although provided with ordinary configuration as regards the capability of closing the tubular sides one next to the other one, is characterised by more practical and more secure articulation modes with reference to the capability of folding the two sides (in such a way that volume in height and width is minimized).

The introduction of the aforementioned innovative modes to compact the push chair of the invention is the real solution on which the present invention is based, which has made it possible to achieve multiple interesting objectives.

Indeed, the first purpose of the present invention is to reduce the height of the push chair in compacted position; this result has been obtained by compacting each side with respect to the rear tubular vertical section, rather than the front tubular section/hypotenuse, in such a way that the other elements of the push chair that are being compacted against the push chair do not protrude either in lower or upper position.

This means that the entire push chair in compacted condition does not exceed the height of the rear tubular vertical sections of the two sides.

In particular, each vertical section ends with a traditional upper handle used to operate the push chair and supports one of the back wheels in lower position.

The compacting modes of the push chair of the invention are such that, once the push chair has been compacted, the front wheels are places above the back wheels, at a considerable distance from the ground, and no longer in parallel position with the back wheels.

Evidently, once the push chair has been compacted, only the back wheels of the push chair touch the ground, and the push chair can be dragged like a trolley, using the handles placed at the upper end of the rear vertical sections.

In this position, the push chair of the invention is characterised by considerable manoeuvrability, also in view of the fact that—as mentioned earlier, all the other elements, being mutually compacted, are contained in the intermediate space between the handles and the wheels of the two rear vertical sections.

Another purpose of the present invention is to minimize the efforts required to compact the push chair and reduce risks of immediate wear of the metal frame; this result has been obtained by devising a new pivoting system between the ordinary pantograph-shaped crosspieces and the tubular sections of the two sides.

In particular, the idea of associating the ends of the rods of the crosspieces with corresponding sliding sleeves in external position on the tubular sections of the sides has been abandoned, in favour of the realisation of direct hinges, by means of corresponding pins with horizontal axis, between the different levers of the bearing tubular frame of the new push chair of the invention.

Last, but not least, another purpose of the invention is to minimise the volume in width of the push chair of the invention in operating position, including with the user on board.

In particular, the two footrest platforms are traditionally rotated towards the external face of the sides, and are additionally exactly housed in a suitable space located in the structure of the tubular sides, in such a way that they do not protrude with respect to the sides.

Evidently, this is especially advantageous when the user on board of the push chair intends to get close to a car, a water closer, a sidewalk, etc.

For purposes of clarity, the description of the invention continues with reference to the enclosed drawings, which are intended for purposes of illustration only and not in a limiting sense, whereby:

FIGS. 2A and 2B are respectively a front view and a side view (with enlargement) of the bare frame of the push chair of the invention, in an intermediate phase during compaction;

FIGS. 3A and 3B are respectively a front view and a side view (with enlargement) of the bare frame of the push chair of the invention, in its final compacted position;

Figures 1A, 1B:
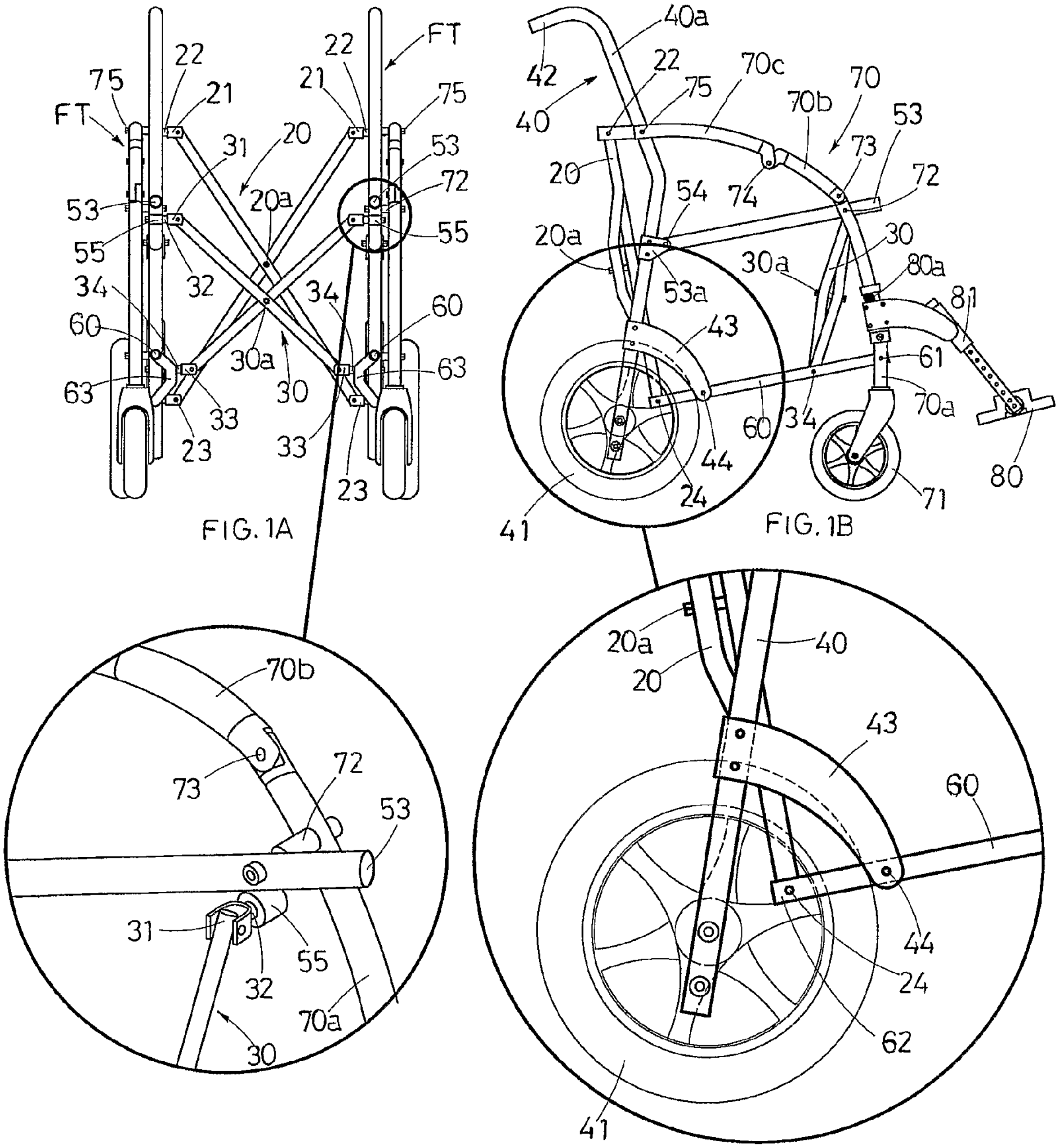
FIGS. 1A and 1B are respectively a front view (with enlargement) and a side view (with enlargement) of the bare frame of the push chair of the invention, in operating position.

With reference to FIGS. 1A and 1B, the push chair of the invention (1) is traditionally formed of two sides with tubular structure (FT) capable of being alternatively brought into a spread operating position (shown in FIG. 1A) and in a close resting position (shown in FIG. 3A) by means of the interposition of two pantograph-shaped crosspieces (20, 30).

The first crosspiece (20) is higher than the second crosspiece (30) and is located on the back of the push chair (1), while the second crosspiece (30) is located towards the front of the push chair (1).

In particular, each side with tubular structure (FT) comprises a bearing element formed of a rear tubular section (40) with basically vertical direction.

A wheel (41) is fixed on the lower end of the vertical tubular section (40), while the upper end (40*a*) of the vertical tubular section (40), preferably folded backwards, ends with a handle (42); in particular, the backwards folded section (40*a*) is normally used to fix one of the lateral borders of a backrest (SC) with collapsible structure.

With specific reference to FIG. 1B, the wheel shown in the figure belongs to the posterior side (FT) and not to the side (FT) in the foreground.

In FIG. 1B, the wheel of the foreground side has been eliminated to ensure a better representation of the different elements of the side.

In any case, an arm (53) facing the front of the push chair (1) is hinged at half height of the vertical tubular section (40) inside a suitable fork (53*a*) and with respect to a pin with horizontal axis (54), being designed to support the lateral border of a seat (SE) with collapsible structure.

A pair of identical arched brackets (43), facing the bottom and the front of the push chair (1), with hook-shaped outline, is fixed along the vertical tubular section (40), in intermediate position between the arm (53) and the wheel (41).

In particular, the upper/rear ends of the arched brackets (43) are fixed on opposite sides against the vertical tubular section (40), while the lower/front ends are used to hinge, with respect to a pin with horizontal axis (44), a tubular crossbar (60) with slightly ascending direction towards the front of the push chair (1).

The front end of the crossbar (60) is hinged, with respect to a pin with horizontal axis (61), towards the lower end of an additional vertical tubular section (70), with curved outline and articulated structure, which supports a swivel wheel (71) in lower position.

In particular, the articulated tubular section (70) extends from the swivel wheel (71) to the backwards folded section (40*a*) of the rear vertical section (40).

It is formed of three different mutually hinged parts (70*a*, 70*b*, 70*c*), of which the lower section (70*a*) is hinged in lower position with the crossbar (60) and pivoted in upper position, with respect to a suitable pin with horizontal axis (72) with the arm (53) designed to support the seat (SE).

Upstream the arm (53), the first section (70*a*) is pivoted, with respect to a suitable pin with horizontal axis (73), with the second section (70*b*) of the vertical section (70); it being provided that the section (70*b*) is in turn pivoted in upper position, with respect to a pin with horizontal axis (74), with the third section (70*c*) of the vertical tubular section (70), which is pivoted on the opposite end, with respect to a pin with horizontal axis (75) in external position with the upper section (40*a*), slightly inclined backwards, of the rear vertical tubular section (40).

Figure 4A:
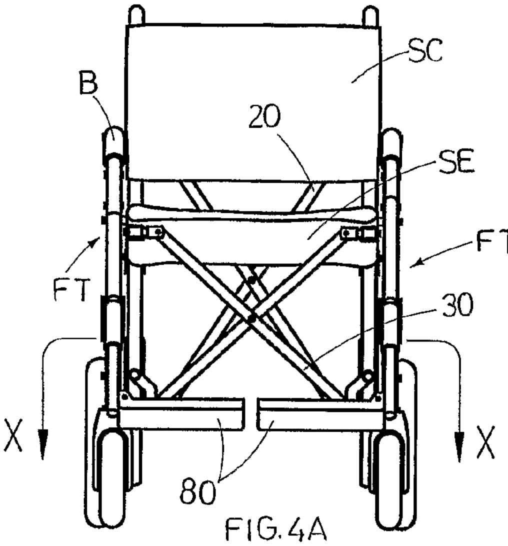
FIGS. 4A and 4B are respectively a front view and a side view of the push chair of the invention complete with seat and backrest.
Figure 4B:
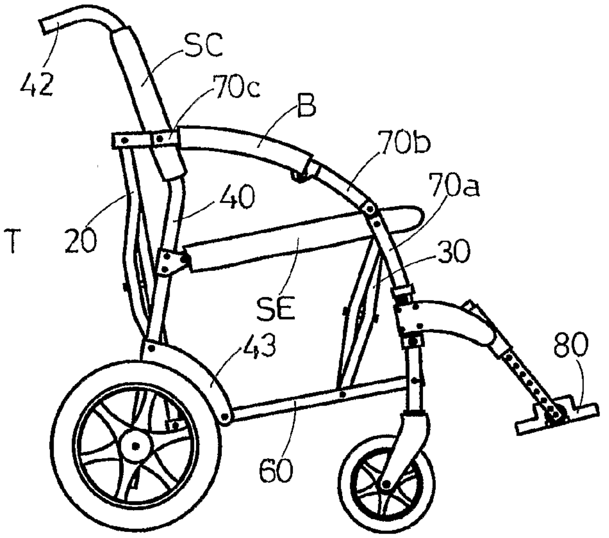

As shown in FIG. 4B, the upper section (70*c*), being suitably upholstered, of the articulated vertical section (70) also acts as armrest (B).

Moreover, the intermediate (70*b*) and upper (70*c*) parts of the articulated vertical section (70) are pivoted with compass-shaped configuration.

A sleeve (80*a*) is mounted on the lower section (70*a*), above the point where the entire articulated vertical section (70) and the lower crossbar (60) are hinged, with possibility of rotating by 180°, to support a projecting footrest platform (80).

As mentioned above, the two tubular sides (FT) are connected by means of the aforementioned pantograph-shaped crosspieces (20, 30).

In particular, each crosspiece (20, 30) is formed of a traditional pair of mutually hinged rods, with respect to suitable pins (20*a*, 30*a*) with basically horizontal axis.

The upper ends (21) of the rods of the rear crosspiece (20), i.e. the highest one, are pivoted with respect to pins with horizontal axis (22) on corresponding wings (45) protruding edgeways on the back of the upper section (40*a*) of the vertical tubular section (40), while the lower ends (23) are hinged, with respected with pins with horizontal axis (24), on the rear ends (62) of the lower tubular crossbars (60).

As shown in the enclosed figures, the pins (22, 24) used to pivot the rods of the crossbar (20) with respect to the two sides (FT) have an orthogonal position to the pin (20*a*) used to mutually pivot the rods.

The upper ends (31) of the front crossbar (30) are pivoted, with respect to pins with horizontal axis (32), on cylindrical bushes (55) mounted in lower position on the arms (53) that support the seat (SE), as expressly shown in the enlargement of FIG. 1A, while the lower ends (33) are pivoted, with respect to pins with horizontal axis (34), on the lower tubular crossbars (60) of the sides (FT), in more internal position with respect to the hinging point between the latter and the front vertical sections (70).

Naturally, also the pivoting pins (32, 34) have an orthogonal position with respect to the pin (30*a*) used to mutually pivot the rods of the front crosspiece (30).

Figure 4C:
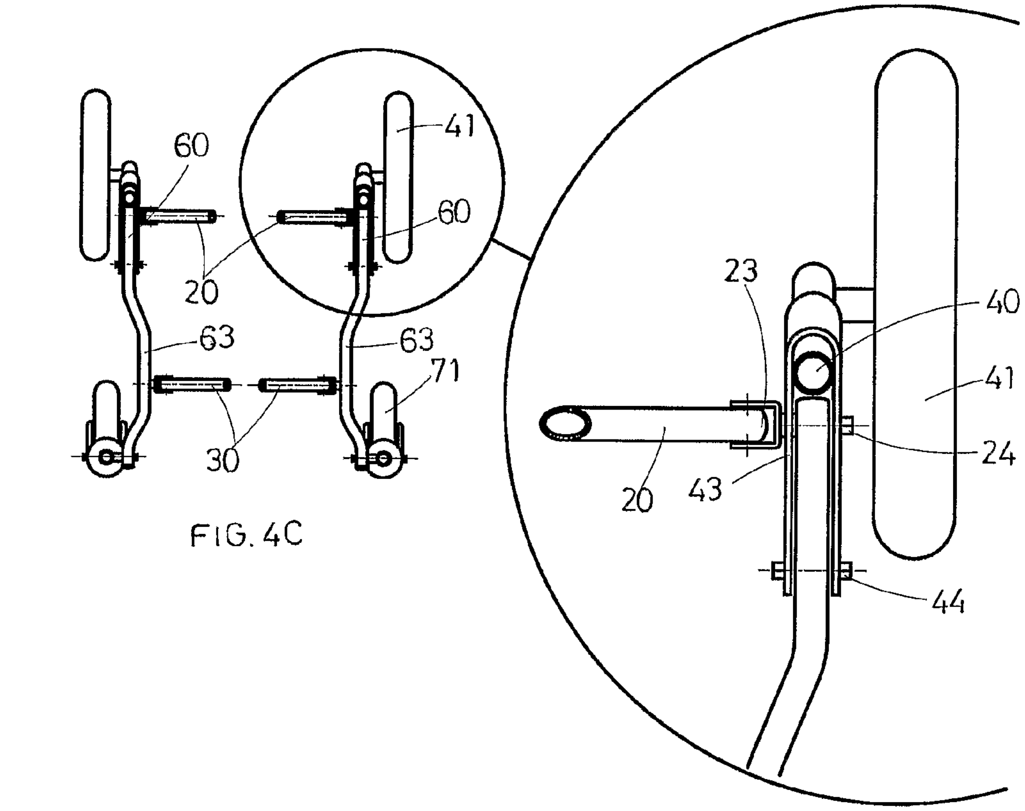
FIG. 4C is a partial cross-section with plane X-X (with enlargement) of FIG. 4A.

In particular, as shown in FIG. 4C, the hinging point between the rods of the front crosspiece (30) and the two tubular crossbars (60) is located in a large concave section (63), with inwards direction, located in each crossbar (60).

The push chair of the invention (1) can be closed by means of the aforementioned levers by bringing the two tubular sides (FT) in very close position and the articulated front vertical section (70) on the back of the front vertical section (40) because of rototranslation from down upwards and from the front backwards.

In particular, the push chair (1) can be closed by preferably using the two arms (53) designed to support the seat (SE), after releasing a safety lock (not shown in the enclosed figures) that rigidly constrains the front vertical sections (70) of the tubular sides (FT):

Once the lock is released, the two arms (53) are rotated upwards and backwards by about 90°, by preferably using their front ends.

As shown in FIGS. 2A/2B and 3A/3B, the rotation of the arms (53) determines the simultaneous movement of the two sides (FT), which are brought close, and the upwards backwards rotation of the articulated sections (70) of the sides (FT), so that the sections (70) are brought in close position parallel to the corresponding rear sections (40), although staggered upwards.

The aforementioned figures also show that the two sides (FT) are gradually brought close while the two rods of the two pantograph-shaped crosspieces (20, 30) are progressively closed, with a progressive higher height of the two crosspieces (20, 30).

If we consider that the upper ends (21) of the rods of the rear crosspiece (20) are hinged on corresponding fixed wings (45), it is evident that the higher height of the rods of the crosspiece (20) is necessarily discharged downwards, on the rear ends (62) of the tubular crossbars (60), to which the lower ends (23) of the rods are hinged.

As mentioned earlier, the lower tubular crossbar (60) of each side (FT) is pivoted, with respect to a pin with horizontal axis (44), to the corresponding pair of arched brackets (43) fixed on the rear vertical section (40).

Evidently, the downward thrust discharged by the progressive closing of the rods of the rear crossbar (20) on the rear ends of the tubular crossbars (60) imposes a 90° rotation on the crossbars (60) so that the same crossbars (60) move from a basically horizontal position (which corresponds to the operating position of the push chair (1), as shown in FIG. 1B) to a basically vertical position (which corresponds to the resting position of the push chair (1), as shown in FIG. 3B).

A comparison between the enlargements enclosed to FIGS. 1B, 2B and 3B shows, in particular, the progressive effects of the thrust discharged when closing the rear crosspiece (20) on the rear ends (62) of the lower tubular crossbars (60) of the two tubular sides (FT).

Obviously, also the closing of the front crosspiece (30) determines an increase in the height of its rods.

In this case, the higher height is recovered by the fact that, within each side (FT), the upward traction of the arm (53) that supports the seat (SE) determines the corresponding rise of the tubular crossbar (60); this is due to the fact that each arm (53) is joined to the crossbar (60) by means of the crosspiece (30).

The simultaneous upward rotation of the two elements (53, 60) also determines an increase of the distance between the pins (34), which are used to pivot the lower ends (33) of the rods of the crosspiece (30) with the tubular crossbars (60), and the pins (32), which are used to pivot the upper ends (31) of the rods with respect to the bushes (55) located in lower position on the arms (53) that support the seat (SE).

The same figures show that the combined action of the aforementioned levers determines—starting from the upward rotation of the arms (53) of the seat and the crossbars (60)—also the upwards backwards translation of the front articulated section (70) of the two tubular sides (FT), so that the swivel wheel (71) supported on the lower end is brought in close position above the back wheel (41).

During the rototranslation of the entire front section (70), the articulated parts (70*a*, 70*b*, 70*c*) tend to progressively lose their initial alignment, due to the presence of the pins (72, 73, 74).

In particular, as shown in FIG. 3B, at the end of the rototranslation, the lower section (70*a*) and the intermediate section (70*b*) of the articulated front section (70) are perfectly aligned (with a slightly curved direction), with the upper end of the intermediate section (70*b*) at the same height as the handle (42) of the fixed rear section (40).

Being constrained next to the fixed vertical section (40), the upper section (70*c*) of the articulated section (70) is brought in vertical position parallel to the two consecutive parts (70*a*, 70*b*).

This last position of the three parts of the articulated section (70) is made possible by means of the compass-shaped hinging between the intermediate section (70*b*) and the upper section (70*c*).

Once the push chair (1) is closed, the front wheels (71) are placed inside the concave parts (63) of the lower tubular crossbars (60) of the corresponding sides (FT).

This minimizes the lateral volume of the push chair (1) in compacted position; FIG. 3B shows the position that can be given to the footrest platforms (80) in resting position.

As mentioned above, each footrest platform (80) can rotate from its projecting operating position in front of the push chair by approximately 180°, together with the supporting arm (81), and can be brought next to the side (FT).

The same platform (80) can also be brought in edgeways position in close contact with the tubular side (FT) to minimize lateral projections.

The concave parts (63) situated along the lower crossbars (60) of the two tubular sides (FT) of the push chair (1) have a very important function when the push chair is in operating position with the user on board.

As a matter of fact, they can be used to house the two platforms (80), after rotating them laterally in edgeways position; due to this special position, the two platforms do not protrude on the sides of the push chair of the invention (1), thus making manoeuvring easier and safer when the push chair is getting close to a car, a water closet, etc.

Finally, it is worthwhile saying that the push chair (1) could operate according to the opening/closing modes as described above also in a version without the intermediate (70*b*) and upper (70*c*) parts of the front articulated sections (70) of the tubular sides (FT), that is to say in a constructive embodiment without armrests (B).

This is because the lower section (70*a*) of the articulated vertical sections (70) would be however capable of guaranteeing perfect cooperation of all levers that are necessary to close and open the push chair of the invention; reference is made to cooperation between each arm (53) used to support the seat (SE) and the corresponding tubular crossbar (60) below.

The invention claimed is:

1. Pushchair for elderly or disabled adults, of the type formed of a first and a second tubular side, having a seat and a backrest respectively fixed between the first and the second tubular side, the seat and the backrest being respectively formed of collapsible material, the first and second tubular side being capable of being brought closer and farther relative to one another by means of a first and a second pantograph-shaped crosspieces, the first pantograph-shaped crosspieces comprising a rear crosspiece and the second pantograph-shaped crosspieces comprising a front crosspiece, the front crosspiece being shorter than the rear crosspiece, the front crosspiece and the rear crosspiece being interposed between the first and the second tubular side, wherein:

the first tubular side is formed of a first rear vertical tubular section and of a first short front vertical tubular section, wherein a first wheel is supported at the lower end portion the first rear vertical tubular section, wherein the upper end portion of the first rear vertical tubular section extends upwardly and is slightly incline backwards relative to the back end portion of the pushchair, wherein the upper end portion of the first rear vertical tubular section forms a first handle, wherein a first swivel wheel is supported at the lower end portion of the first short front vertical tubular section, and wherein the first rear vertical tubular section is longer than the first short front vertical tubular section;

the first rear vertical tubular section and the first short front vertical tubular section are mutually connected and articulated by means of a first lower crossbar and a first arm on a first side of the pushchair, wherein the first lower crossbar and the first arm are capable of joint oscillations;

the pushchair characterized in that, the first lower crossbar is pivoted, with respect to a suitable pin with horizontal axis, between an end portion of a first inward protruding bracket towards the bottom end portion of the first rear vertical tubular section and a first point on the first short front vertical tubular section near the lower end portion of the first short front vertical tubular section;

the second tubular side is formed of a second rear vertical tubular section and of a second short front vertical tubular section, wherein a second wheel is supported at the lower end portion the second rear vertical tubular section, wherein the upper end portion of the second rear vertical tubular section extends upwardly and is slightly incline backwards relative to the back end portion of the pushchair, wherein the upper end portion of the second rear vertical tubular section forms a second handle, wherein a second swivel wheel is supported at the lower end portion of the second short front vertical tubular section, and wherein the second rear vertical tubular section is longer than the second short front vertical tubular section;

the second rear vertical tubular section and the second short front vertical tubular section are mutually connected and articulated by means of a second lower crossbar and a second arm on the other side of the pushchair, wherein the second lower crossbar and the second arm are capable of joint oscillations, and wherein the first arm and the second arm support the seat;

the pushchair characterized in that, the second lower crossbar is pivoted, with respect to a suitable pin with horizontal axis, between an end portion of a second inward protruding bracket towards the bottom end portion of the second rear vertical tubular section and a second point on the second short front vertical tubular section near the lower end portion of the second short front vertical tubular section;

the rear crosspiece is positioned in such a way that respective upper end portions of the rear crosspiece are respectively fixed, with respect to suitable pins with horizontal axis, on corresponding wings protruding edgeways on the back of the slightly backwardly inclined portion of the respective upper end portion of the first and the second rear vertical tubular section, while the respective lower ends of the rear crosspiece are pivoted, with respect to suitable pins with horizontal axis, on respective rear end portion of the first and the second lower crossbar, upstream from the respective pivoting point between the first lower crossbar and the first inward protruding bracket, and between the second lower crossbar and the second inward protruding bracket, respectively; and respective upper end portions of the front crosspiece are respectively pivoted, with respect to pins with horizontal axis, under the first and the second arm, respectively, while the respective lower end portions of the front crosspiece are respectively pivoted, with respect to pins with horizontal axis, on the first and the second lower crossbar, in internal position in comparison to the pivoting point of the first and the second lower crossbar with the first and second short front vertical tubular section, respectively.

2. Pushchair according to claim 1, characterized in that the first arm and the second arm are pivotable, wherein the first arm is pivotable with respect to a suitable pin with horizontal axis, between a central point on the first rear vertical tubular section and a point on the top end portion of the first short front vertical tubular section, and wherein the second arm is pivotable with respect to a suitable pin with horizontal axis, between a central point on the second rear vertical tubular section and a point on the top end portion of the second short front vertical tubular section.

3. Pushchair according to claim 2, characterized in that the first arm is hinged to the first rear vertical tubular section by means of a first inwards protruding fork, and the second arm is hinged to the second rear vertical tubular section by means of a second inwards protruding fork.

4. Pushchair according to claim 1, characterized in that the respective upper end portions of the front crosspiece are respectively pivoted to the first and the second arm, by means of suitable corresponding first bushing and second bushing, wherein the first bushing has a horizontal axis and is mounted in lower position on the first arm, and wherein the second bushing has a horizontal axis and is mounted in lower position on the second arm.

5. Pushchair according to claim 1, characterized in that the pushchair is provided with a first sleeve and a second sleeve, the first sleeve is provided on the first short front vertical tubular section and the second sleeve is provided on the second short front vertical tubular section, the first sleeve is designed to support a first footrest platform in protruding position by means of a first suitable supporting arm with adjustable length, the second sleeve is designed to support a second footrest platform in protruding position by means of a second suitable supporting arm with adjustable length, wherein the first and the second sleeve are respectively capable of externally rotating by about 180° respectively on the first and the second tubular side; wherein the first and second footrest platform can respectively be positioned edgeways, in non-operating position, with respect to the first and second suitable supporting arm respectively.

6. Pushchair according to claim 1, characterized in that the first lower crossbar is disposed in lower position on the first tubular side, the first lower crossbar has a concave inward section, the second lower crossbar is disposed in lower position on the second tubular side, the second lower crossbar has a concave inward section, the concave inward section of the first lower crossbar is symmetrically opposed to the concave inward section of the second lower crossbar, wherein the concave inward section of the first lower crossbar is disposed in intermediate position between the front end of the first lower crossbar and the hinging point with the first inward protruding bracket, wherein the concave inward section of the second lower crossbar is disposed in intermediate position between the front end of the second lower crossbar and the hinging point with the second inward protruding bracket; and a first footrest platform is pivoted to the first short front vertical tubular section, and a second footrest platform is pivoted to the second short front vertical tubular section, wherein when the pushchair is in operating position, the concave inward section of the first lower crossbar can house the first footrest platform and the concave inward section of the second lower crossbar can house the second footrest platform, when the first footrest platform and the second footrest platform are each respectively rotated laterally and positioned edgeways when the pushchair is in collapsed position.

7. Pushchair according to claim 1, characterized in that laterally disposed end portions of the backrest are fixed to the respective slightly backwardly inclined portion of the upper end portion of the first and the second rear vertical tubular section.

8. Pushchair according to claim 1, characterized in that the first tubular side comprises a first front vertical section with articulated vertical structure extending from the first swivel wheel to a side of the slightly backwardly inclined portion of the upper end portion of the first rear vertical tubular section, wherein the first front vertical section with articulated vertical structure includes, in addition to the first shorter front vertical section, a first intermediate section and a first upper section, wherein the lower end portion of the first intermediate section is hinged, with respect to a pin with horizontal axis, to the upper end portion of the first shorter front vertical section, slightly upstream from the hinging point between the upper end portion of the first shorter front vertical section and the first arm, wherein the upper end portion of the first intermediate section is hinged, with respect to a pin, with horizontal axis, to the lower end portion of the first upper section, the first upper section comprises a first armrest, the upper end portion of the first armrest is pivoted, with respect to a pin with horizontal axis, on the side of the slightly backwardly inclined portion of the upper end portion of the first rear vertical tubular section, wherein the first intermediate section and the first upper section are mutually hinged to one another; and the second tubular side comprises a second front vertical section with articulated vertical structure extending from the second swivel wheel to a side of the slightly backwardly inclined portion of the upper end portion of the second rear vertical tubular section, wherein the second front vertical section with articulated vertical structure includes, in addition to the second shorter front vertical section, a second intermediate section and a second upper section, wherein the lower end portion of the second intermediate section is hinged, with respect to a pin with horizontal axis, to the upper end portion of the second shorter front vertical section, slightly upstream from the hinging point between the upper end portion of the second shorter front vertical section and the second arm, wherein the upper end portion of the second intermediate section is hinged, with respect to a pin, with horizontal axis, to the lower end portion of the second upper section, the second upper section comprises a second armrest, the upper end portion of the second armrest is pivoted, with respect to a pin with horizontal axis, on the side of the slightly backwardly inclined portion of the upper end portion of the second rear vertical tubular section, wherein the second intermediate section and the second upper section are mutually hinged to one another.

* * * * *